(12) United States Patent
Moskovich

(10) Patent No.: US 6,445,512 B1
(45) Date of Patent: Sep. 3, 2002

(54) PROJECTION TELEVISION LENS SYSTEMS HAVING IMPROVED MODULATION TRANSFER FUNCTIONS

(75) Inventor: Jacob Moskovich, Cincinnati, OH (US)

(73) Assignee: U.S. Precision Lens Incorporated, Cincinnati, OH (US)

(*) Notice: Subject to any disclaimer, the term of this patent is extended or adjusted under 35 U.S.C. 154(b) by 0 days.

(21) Appl. No.: 09/720,538
(22) PCT Filed: Jun. 18, 1999
(86) PCT No.: PCT/US99/13795
  § 371 (c)(1),
  (2), (4) Date: Dec. 22, 2000
(87) PCT Pub. No.: WO99/67662
  PCT Pub. Date: Dec. 29, 1999

Related U.S. Application Data
(60) Provisional application No. 60/090,518, filed on Jun. 24, 1998.

(51) Int. Cl.[7] ............... G02B 9/62; G02B 3/00
(52) U.S. Cl. ............ 359/757; 359/756; 359/759; 359/713; 359/649; 359/682
(58) Field of Search ............ 359/757, 756, 359/752, 754, 713, 759, 649, 676, 682, 683; 348/781

(56) References Cited

U.S. PATENT DOCUMENTS

| 4,560,253 A | * | 12/1985 | Ogino ............ 359/682 |
|---|---|---|---|
| 4,900,139 A | * | 2/1990 | Kreitzer ............ 359/649 |
| 4,989,961 A | | 2/1991 | Yoshioka |
| 5,548,447 A | | 8/1996 | Toyama |
| 5,808,804 A | | 9/1998 | Moskovich |
| 5,946,142 A | | 8/1999 | Hirata et al. |
| 6,023,375 A | * | 2/2000 | Kreitzer ............ 359/649 |
| 6,285,509 B1 | * | 9/2001 | Nakayama et al. ......... 359/676 |

FOREIGN PATENT DOCUMENTS

EP 764865 3/1997

OTHER PUBLICATIONS

Dunham, C.B., and C.R. Crawford, "Minimax Approximation by a Semi–Circle," *Society for Industrial and Applied Mathematics*, vol. 17, No. 1, Feb., 1980.

*The Handbook of Plastic Optics*, U.S. Precision Lens, Inc., Cincinnati, Ohio, 1983, pp. 17–29.

* cited by examiner

Primary Examiner—Loha Ben
(74) Attorney, Agent, or Firm—Maurice M. Klee

(57) ABSTRACT

Six-component projection lens systems (13) for use in CRT projection televisions (10) are provided. To provide an improved overall modulation transfer function across the field of view of the lens, the system's first lens element (L1) has an object side surface ($S_2$) which has a best fit spherical surface which is convex to the CRT (16). To provide partial axial color correction, the system's second lens element (L2) is made of a high dispersion material, such as styrene.

11 Claims, 13 Drawing Sheets

PROJECTION TELEVISION LENS SYSTEMS HAVING IMPROVED MODULATION TRANSFER FUNCTIONS

CROSS REFERENCE TO RELATED APPLICATIONS

This application is the U.S. national phase of International Application No. PCT/US99/13795 filed Jun. 18, 1999, and claims the benefit under 35 USC §119(e) of U.S. Provisional Application No. 60/090,518 filed Jun. 24, 1998, the contents of both of which in their entireties are hereby incorporated by reference.

International Application No. PCT/US99/13795 was published in English as WO 99/67662 on Dec. 29, 1999.

FIELD OF THE INVENTION

This invention relates to projection lens systems for use in projection televisions and, in particular, to projection lens systems having improved correction of higher order off-axis aberrations, especially coma and astigmatism. and thus improved overall modulation transfer functions across the field of view of the lens in comparison to prior lens systems having a similar construction.

BACKGROUND OF THE INVENTION

U.S. application Ser. No. 08/715,028, now U.S. Pat. No. 5,808,804, the contents of which were published on Mar. 26, 1997 as EPO Patent Publication No. 764,865, discloses projection lens systems for CRT projection televisions which employ five lens elements and a negative lens unit which is associated with the CRT during use of the lens system.

Although the lens systems of U.S. Pat. No. 5,808,804 work successfully for many applications, it has been found that the level of correction of higher order off-axis aberrations, especially coma and astigmatism, achieved by these prior lens systems result in less than desired overall modulation transfer functions (MTFs) across the field of view of the lens.

The present invention addresses this observed property of these prior lenses while maintaining their otherwise desirable characteristics.

SUMMARY OF THE INVENTION

In view of the foregoing, it is an object of the present invention to provide improved projection lens systems for use in projection televisions and, in particular, in rear projection televisions.

More particularly, it is an object of the invention to provide projection lens systems capable of covering a semi-field of view of up to about 40° at a f-number at infinity on the order of 1.0, while at the same time providing an image quality which is sufficiently high to satisfy the requirements of modern consumer projection TV systems, including the requirements of high definition televisions (HDTV).

It is an additional object of the invention to provide projection lens systems having the foregoing characteristics which are also partially corrected for axial color.

It is a further object of the invention to provide projection lens systems which can be manufactured at a reasonable cost.

To achieve the foregoing and other objects, the invention provides a projection lens system for use in combination with a cathode ray tube comprising in order from the image (screen) side:

(a) a first lens element (L1) which has a positive power, an image side surface ($S_1$), and an object side surface ($S_2$), wherein:
 (i) at least one of the image and object side surfaces is aspherical; and
 (ii) the object side surface has a best fit spherical surface which is convex to the cathode ray tube, i.e., the object side surface has a best fit spherical radius $R_{2BF}$ which, under the standard convention for assigning radii to optical surfaces, is less than zero (see Table 5);
(b) a second lens element (L2) which has a negative power, at least one aspheric surface, and is composed of a high dispersion material (e.g., styrene);
(c) a third lens element (L3) which has a positive power and provides a substantial portion of the power of the lens system;
(d) a fourth lens element (L4) which has a weak power, at least one aspheric surface, and an overall meniscus shape which is concave to the cathode ray tube;
(e) a fifth lens element (L5) which has a positive power and at least one aspheric surface; and
(f) a lens unit ($U_N$) which has a strong negative power, is associated with the CRT during use of the lens system, and provides most of the correction for the field curvature of the lens system.

In certain preferred embodiments, the first element's image side surface ($S_1$) has a clear aperture $CA_1$ which satisfies the following relationship:

$$\tfrac{1}{2} CA_1 > Y_1 \qquad (1)$$

where $Y_1$, is the height of the axial marginal ray at $S_1$. By means of this limitation, more effective correction of off-axis aberrations can be achieved using the portion of the first lens element which lies between $Y_1$ and the clear aperture of the lens. Preferably, the first element's image side surface satisfies the following relationship:

$$\tfrac{1}{2} CA_1 > 1.1 \cdot Y_1. \qquad (2)$$

In other preferred embodiments, the first element's image side surface has a best fit radius $R_{1BF}$ which satisfies the following relationship:

$$|R_{1BF}| > |R_{2BF}|. \qquad (3)$$

That is, the best fit power of the CRT side of the first lens element is greater than the best fit power of the screen side of that element.

In still further preferred embodiments, the lens system has some or all of the following characteristics: (1) each of the first, second, fourth, and fifth lens elements has two aspheric surfaces; (2) the third lens element is biconvex and provides the majority of the power of the lens system, i.e., the focal length of the third lens element is between about 0.8 and about 1.6 times the focal length of the entire lens system; and (3) the fourth lens element has a positive power.

As used herein, the term "weak" is used to describe an element whose focal length has a magnitude which is at least about 2.5 times the effective focal length of the entire lens system, and the term "strong" is used to describe an element or unit whose focal length has a magnitude which is less than about 2.5 times the effective focal length of the entire lens system.

Figure 1A:
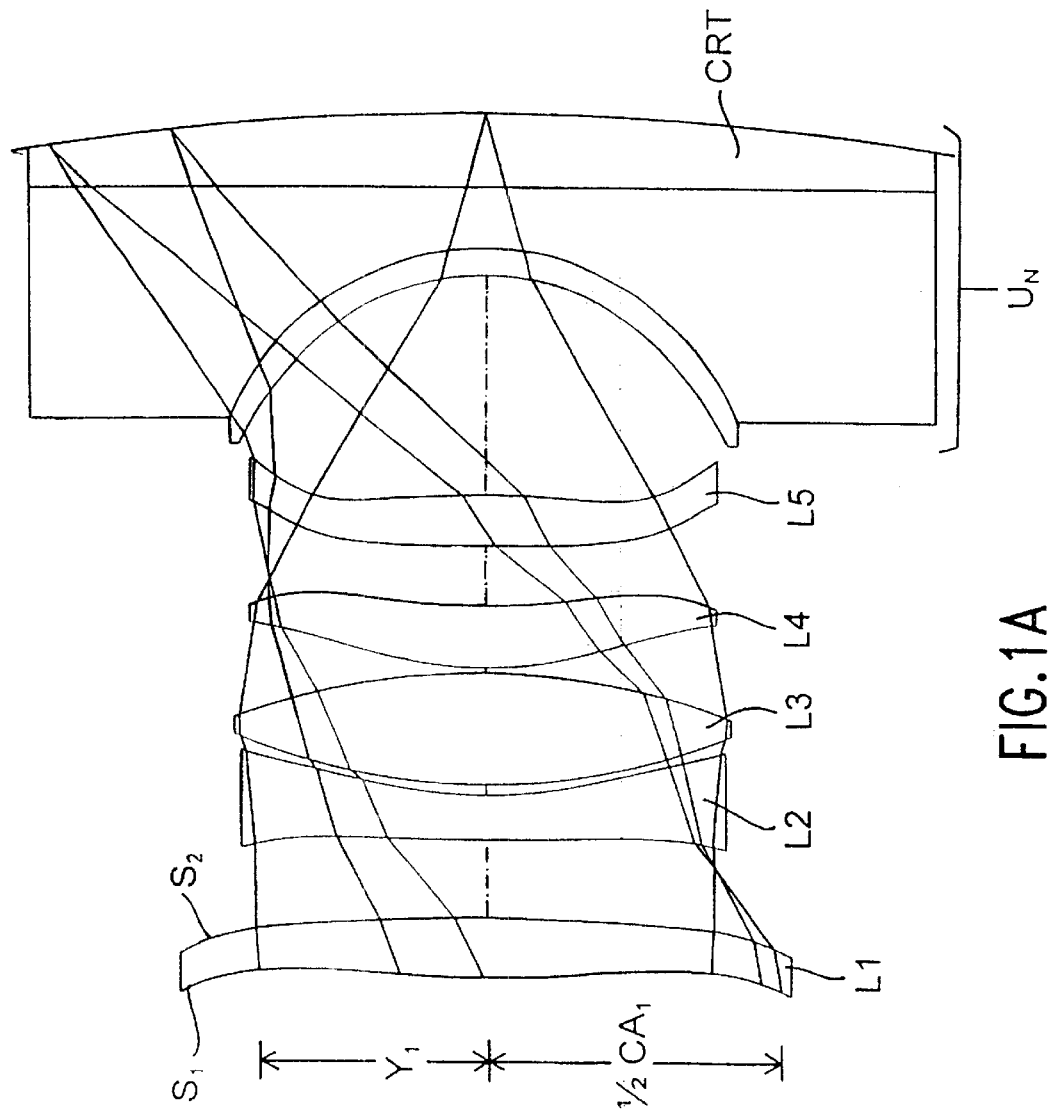
FIGS. 1A, 2A, 3A, and 4A are schematic side views of lens systems constructed in accordance with the invention.

Table 6 sets forth the system parameters for the MTF/OTF plots of FIGS. 1B, 1C, 2B, 2C, 3B, 3C, 4B, and 5.

The foregoing drawings, which are incorporated in and constitute part of the specification, illustrate the preferred embodiments of the invention, and together with the description, serve to explain the principles of the invention. It is to be understood, of course, that both the drawings and the description are explanatory only and are not restrictive of the invention.

DESCRIPTION OF THE PREFERRED EMBODIMENTS

As discussed above the present invention is directed to providing improved projection lenses of the general type disclosed in U.S. Pat. No. 5,808,804, the contents of which are incorporated herein by reference.

In particular, the lenses of the invention have a first lens element which has an object side surface which is convex, rather than concave, to the short conjugate (object) side of the lens system. In addition, to allow for improved correction of off-axis aberrations, the long conjugate (image) side surface of the first lens element has a clear aperture which is substantially greater than the height of the axial marginal ray at that surface. Although such an increase in clear aperture size and thus increase in element size is in general undesirable, in accordance with the invention, it has been found that the increase in size is well justified by the resulting improvement in overall MTF across the field of view of the lens.

The second lens element of the lens systems of the invention has a negative power and is composed of a high dispersion material so as to provide the system with at least some axial color correction. In particular, the negative second lens element is composed of a material having a higher dispersion than the dispersion of the material used for the positive third lens element.

As used herein, a high dispersion material is one having a dispersion like that of flint glass. More particularly, a high dispersion material is one having a V-value ranging from 20 to 50 for an index of refraction in the. range from 1.85 to 1.5, respectively. In contrast, a low dispersion material is one having a dispersion like that of crown glass or, in terms of V-values, one having a V-value ranging from 35 to 75 for an index of refraction in the range from 1.85 to 1.5, respectively.

A preferred high dispersion material for use in constructing the negative second lens element is styrene and a preferred low dispersion material for use in constructing the positive third lens element is a crown-type glass. In place of styrene, other plastics having flint-like dispersions can be used to prepare the negative second lens element, including polycarbonates and copolymers of polystyrene and acrylic such as NAS. See *The Handbook of Plastic Optics*, U.S. Precision Lens, Inc., Cincinnati, Ohio, 1983, pages 17–29.

Each of elements 1, 2, 4, and 5, as well as the field flattener lens unit ($U_N$), has at least one aspherical surface to facilitate the correction of the aberrations of the lens system and, preferably, each of the lens elements has two aspheric surfaces. Because the lens surfaces are aspheric, the overall shapes of the elements are preferably described in terms of best fit spherical surfaces, rather than the radii of curvature of the elements at the optical axis, although in many cases the description of the overall shapes of the elements in terms of best fit spherical surfaces on the one hand and in terms of the radii of curvature at the optical axis on the other will be the same. See Dunham, C. B., and C. R. Crawford, "Minimax Approximation by a Semi-Circle," *Society for Industrial and Applied Mathematics*, Vol. 17, No. Feb. 1, 1980.

To maintain a relatively low cost of the lens system, all the aspherical elements are designed to be manufactured in optical plastic. In particular, for ease of molding, a fairly uniform thickness is maintained across the aperture of each of these elements. Because they are plastic, it is desirable to keep the power of the elements as low as possible so as to minimize shifts in focus of the lens system with changes in ambient temperature. As discussed above, the power element (element 3) is preferably made out of glass.

FIGS. 1–4 illustrate various projection lenses constructed in accordance with the invention. Corresponding prescriptions appear in Tables 1–4. HOYA or SCHOTT designations are used for the glasses employed in the lens systems. Equivalent glasses made by other manufacturers can be used in the practice of the invention. Industry acceptable materials are used for the plastic elements.

The aspheric coefficients set forth in the tables are for use in the following equation:

$$z = \frac{cy^2}{1+[1-(1+k)c^2y^2]^{1/2}} + Dy^4 + Ey^6 + Fy^8 + Gy^{10} + Hy^{12} + Iy^{14}$$

where z is the surface sag at a distance y from the optical axis of the system, c is the curvature of the lens at the optical axis, and k is a conic constant, which is zero except where indicated in the prescriptions of Tables 1–4.

The designation "a" associated with various surfaces in the tables represents an aspheric surface, i.e., a surface for which at least one of D, E, F, G, H, or I in the above equation is not zero. The designation "c" represents a conic surface, i.e., a surface for which k in the above equation is not zero. The tables are constructed on the assumption that light travels from left to right in the figures. In actual practice, the viewing screen will be on the left and the CRT will be on the right, and light will travel from right to left.

The CRT faceplate constitutes surfaces 15–16 in Tables 1, 2, and 4, and surfaces 13–14 in Table 3. A coupling fluid is located between surfaces 14–15 in Tables 1, 2, and 4, and surfaces 12–13 in Table 3. Other than for the CRT faceplate of Table 4 which is composed of FDS9.glass, the material designations for the coupling fluid and the faceplate are set forth as six digit numbers in the tables, where a $N_e$ value for the material is obtained by adding 1,000 to the first three digits of the designation, and a $V_e$ value is obtained from the last three digits by placing a decimal point before the last digit. Optional vignetting surfaces are shown at surfaces 3 and 10 in Tables 1, 2, and 4.

All dimensions given in the prescription tables, as well as in Tables 5 and 6, are in millimeters.

Table 5 summarizes the ½$CA_1$, $Y_1$, $R_{1BF}$, and $R_{2BF}$ values for the projection lens systems of Tables 1–4. As shown in this table, the lens systems of the examples satisfy requirements (1)–(3) set forth above. Indeed, for each of these examples, the ratio of ½$CA_1$ to $Y_1$ is at least equal to 1.3.

For comparison, the ½$CA_1$, $Y_1$, $R_{1BF}$, and $R_{2BF}$ values for Example 3 of U.S. Pat. No. 5,808,804, the only example of that patent which has a high dispersion second lens element, are 40.095 mm, 40.095 mm, 164.3 mm, and 188.1 mm, respectively. Requirements (1)–(3) are thus not met by this prior example. (Examples 1 and 4 of U.S. Pat. No. 5,808,804 have $|R_{1BF}|>|R_{2BF}|$, but like all of the other examples of that patent, the $R_{2BF}$ values for these examples are not less than zero, i.e., the object side surface of the first lens element is not convex towards the CRT.)

FIGS. 1B, 1C, 2B, 2C, 3B, 3C, and 4B are geometric MTF plots for the lenses of Examples 1–4. In particular, these plots show the through-focus MTF on the left and the optical transfer function (OTF) at best axial focus on the right. The data are shown for five field points, viz., the axis, 0.35H, 0.70H, 0.85H and 1.0H, where H is the maximum field height on the screen. The actual field heights are shown for the right hand plots. These field heights apply to both the right hand and left hand plots and are in millimeters.

The through-focus data are at the indicated spatial frequency in cycles per millimeter, i.e., at 2 cycles/mm except for the on-axis plot which is at 2 and 5 cycles/mm. A spatial frequency of 2 cycles/mm is often used in evaluating the performance of projection television systems since it. corresponds to approximately 400 TV lines in the horizontal direction for a five-inch diagonal image on a typical seven-inch CRT tube. A 400. TV line resolution corresponds to the maximum resolution specification for most laser disc players.

Both the through-focus and best-focus data indicate tangential (solid curves) and sagittal (dashed curves) MTF. The modulus scale is on the left of each block and runs from zero to one. The phase of the OTF is shown as a dotted curve in the best-focus plots. The scale for the phase is indicated on the right of each best-focus block and is in radian measure.

All the OTF data are for a wavelength of 546.1 nanometers. The axial focus shifts for the best focus plots of FIGS. 1B, 1C, 2B, 2C, 3B, 3C, 4B, and 5 are 0.02, −0.004, 0.014, −0.018, 0.005, −0.055, −0.006, and −0.077, respectively. These focus shifts are relative to the zero position of the through-focus plots. The best-focus plane is at the peak of the axial through-focus plot.

Figure 4A:
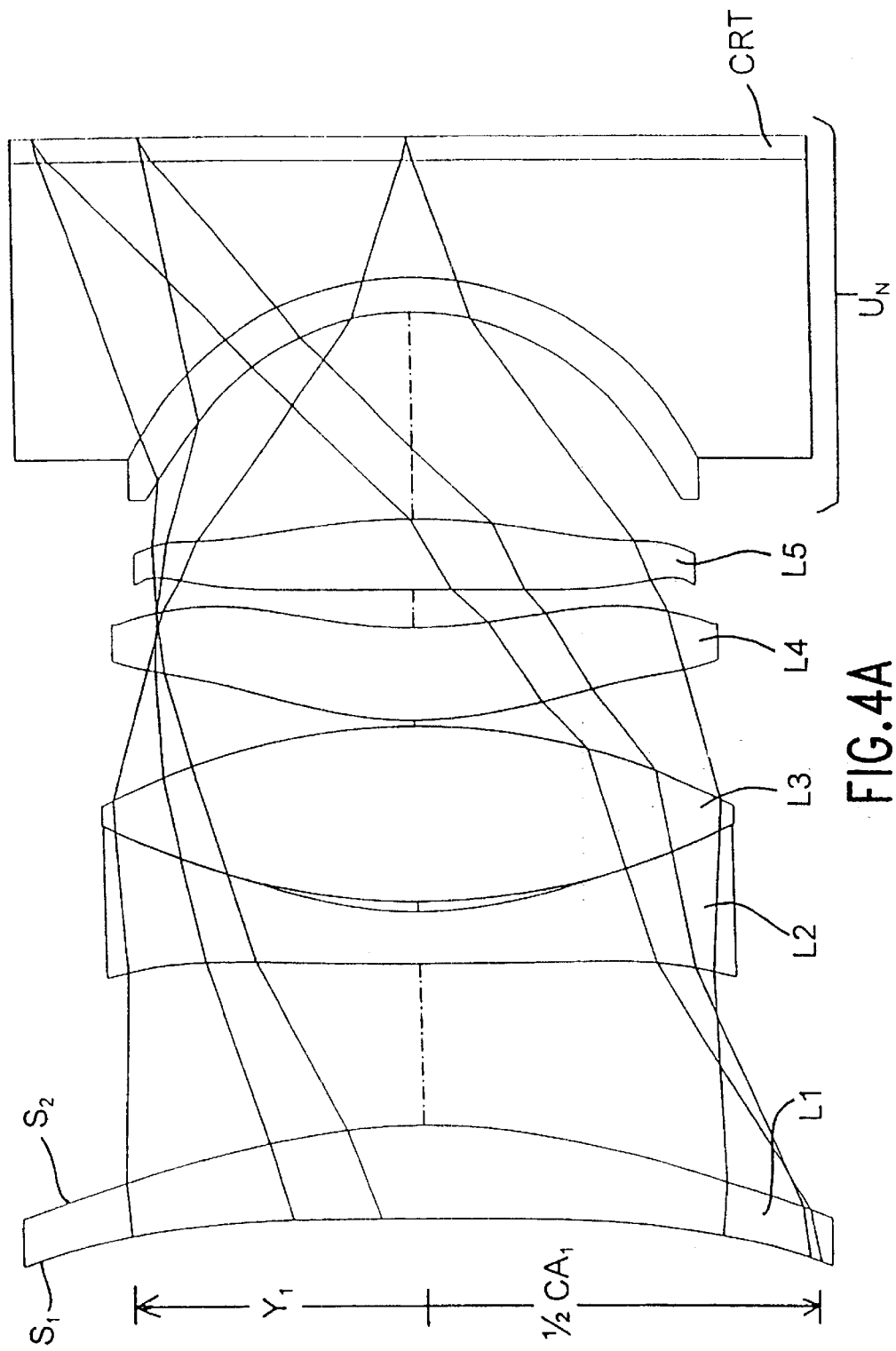
Figure 4B:
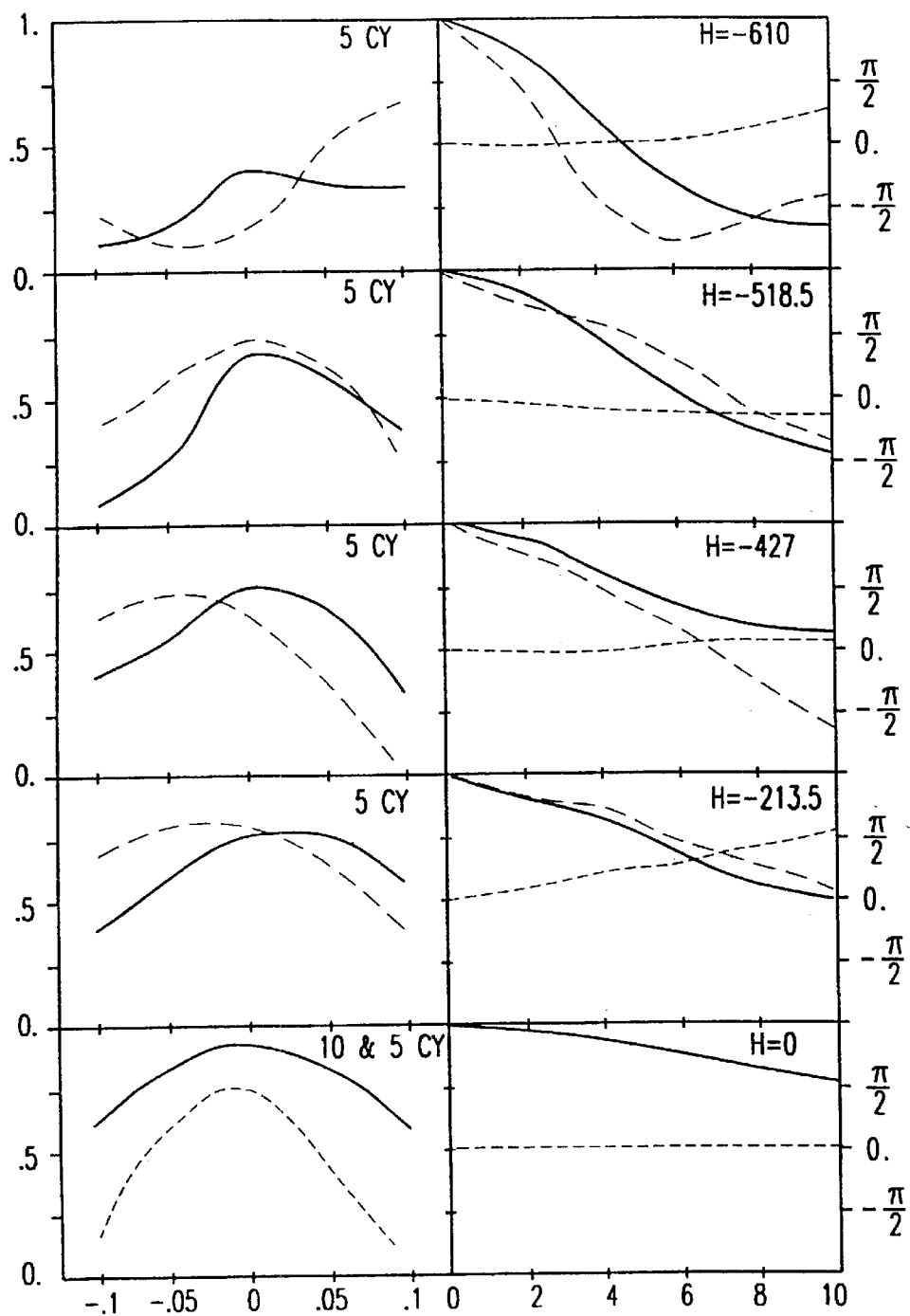
Figure 5:
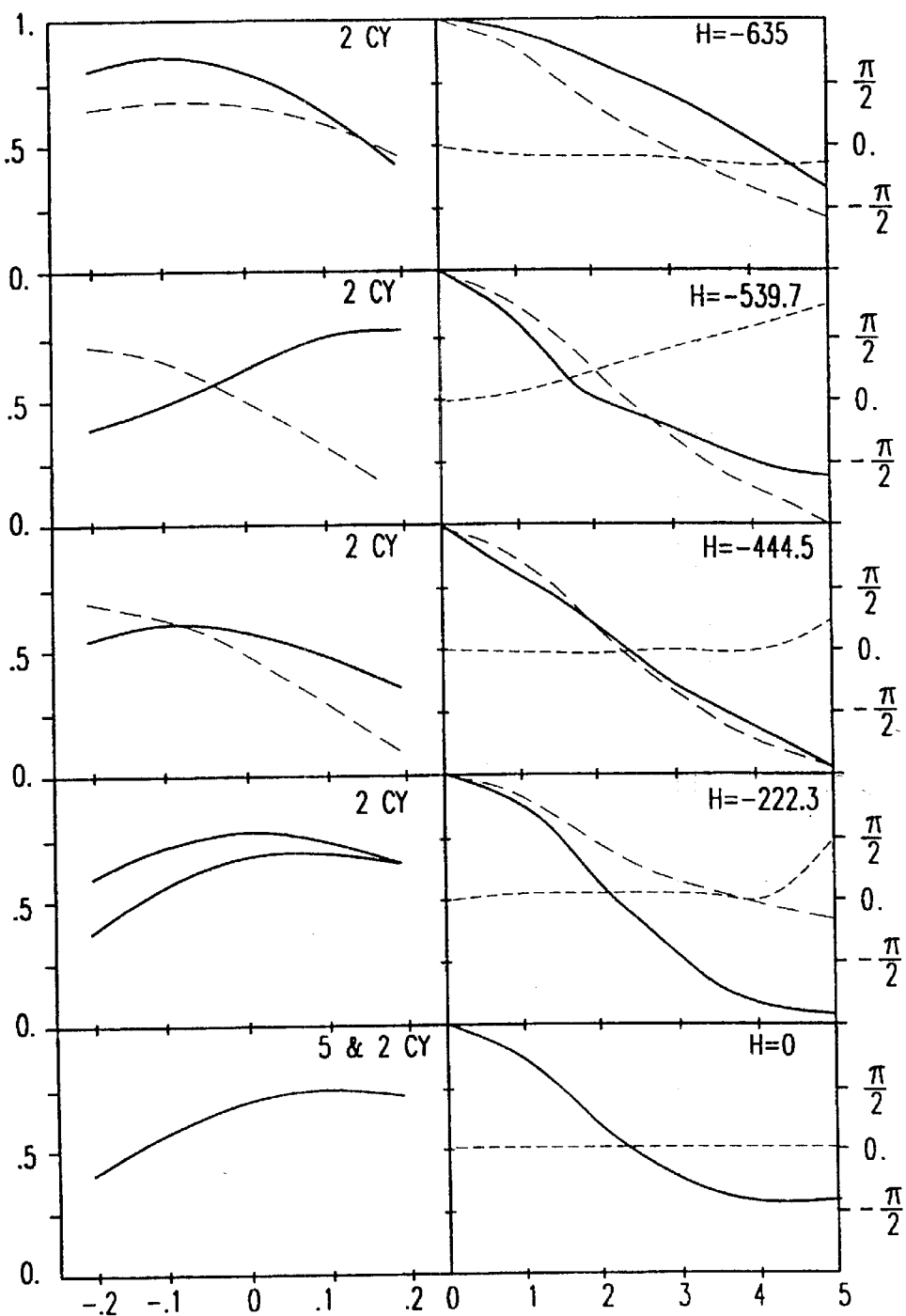
FIG. 5 is a monochromatic MTF/OTF plot. for the lens system of FIG. 3 of U.S. Pat. No. 5,808,804.

FIG. 5 shows a corresponding MTF plot for Example 3 of U.S. Pat. No. 5,808,804. (The plot of FIG. 5 differs from the plot of FIG. 3B of U.S. Pat. No. 5,808,804 in that a diffractive MTF is shown in FIG. 3B, while a geometric MTF is shown in FIG. 5.) An examination of FIG. 5 and FIGS. 1B, 1C, 2B, 2C, 3B, 3C, and 4B shows that the projection lenses of the invention achieve improved overall MTFs across the field of the lens in comparison with the MTFs achieved with the construction of U.S. Pat. No. 5,808,804.

Figure 6:
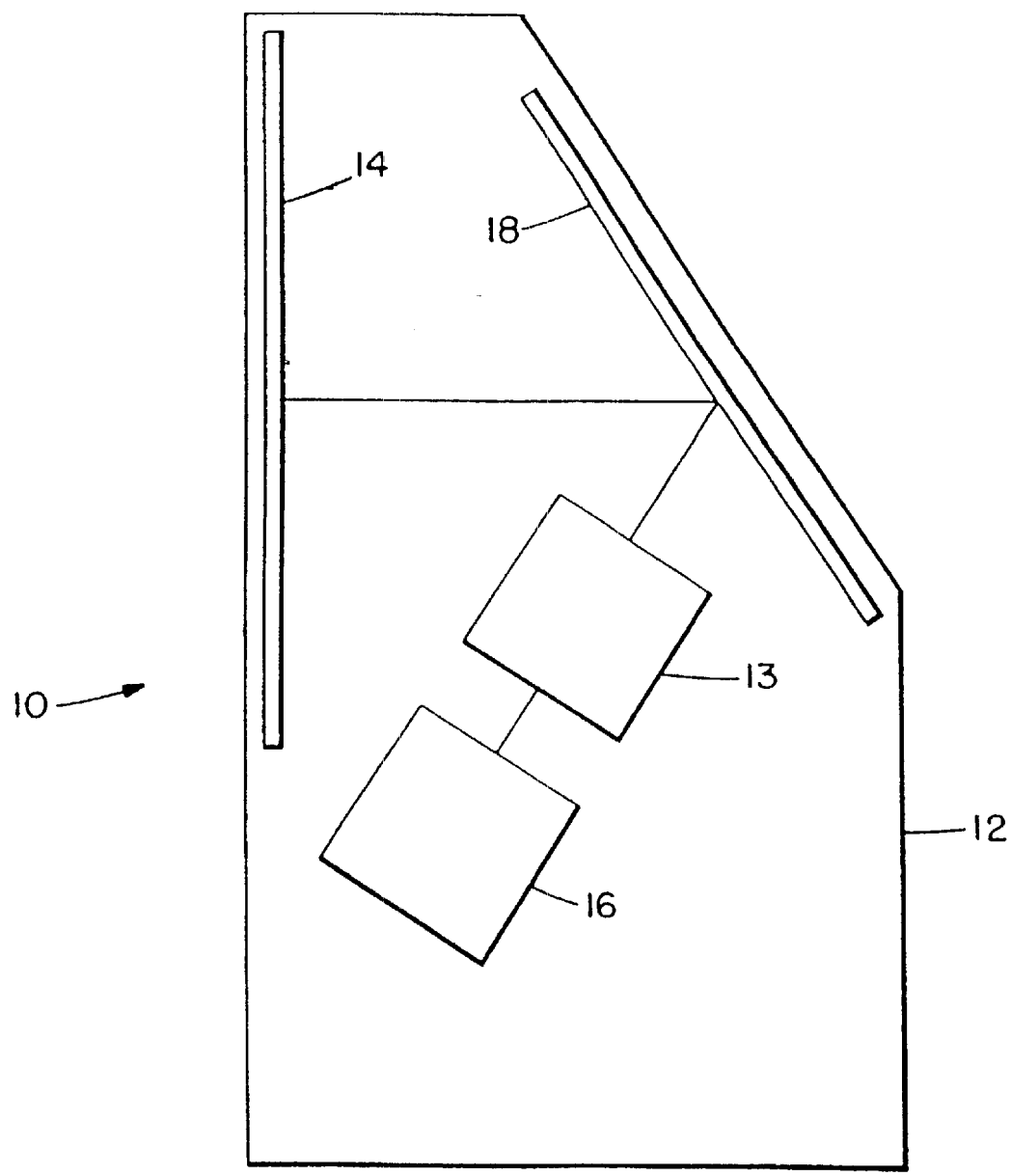
FIG. 6 is a schematic diagram of a projection TV employing a lens system constructed in accordance with the invention.

FIG. 6 is a schematic diagram of a CRT projection television 10 constructed in accordance with the invention. As shown in this figure, projection television 10 includes cabinet 12 having projection screen 14 along its front face and slanted mirror 18 along its back face. Module 13 schematically illustrates a lens system constructed in accordance with the invention and module 16 illustrates its associated CRT tube. In practice, three lens systems 13 and three CRT tubes 16 are used to project red, green, and blue images onto screen 14.

Although specific embodiments of the invention have been described and illustrated, it is to be understood that a variety of modifications which do not depart from the scope and spirit of the invention will be evident to persons of ordinary skill in the art from the foregoing disclosure.

TABLE 1

| Surf. No. | Type | Radius | Thickness | Glass | Clear Aperture Diameter |
|---|---|---|---|---|---|
| 1 | a | 252.8463 | 12.00000 | ACRYLIC | 120.54 |
| 2 | ac | −409.4738 | 9.99443 | | 117.38 |
| 3 | | ∞ | 5.89278 | | 94.00 |
| 4 | a | 626.2584 | 8.80000 | STYRENE | 93.03 |
| 5 | a | 90.3502 | 2.10000 | | 96.62 |
| 6 | | 136.2313 | 23.00000 | BACD5 | 98.75 |
| 7 | | −136.2313 | 1.00000 | | 99.21 |
| 8 | a | 73.4121 | 13.00000 | ACRYLIC | 93.20 |
| 9 | a | 122.0014 | 6.65119 | | 92.17 |
| 10 | | ∞ | 5.90000 | | 87.35 |
| 11 | a | 1027.6169 | 10.50000 | ACRYLIC | 93.64 |
| 12 | a | −159.0282 | Space 1 | | 93.55 |
| 13 | a | −53.0869 | 5.30000 | ACRYLIC | 98.24 |
| 14 | | −56.0000 | 12.00000 | 430500 | 104.00 |
| 15 | | ∞ | 14.80000 | 565500 | 175.00 |
| 16 | | −600.0000 | Image distance | | 190.00 |

Symbol Description a—Polynomial asphere
c—Conic section

Object and Image Surface

| Surface | Radius |
|---|---|
| Image | −599.9999 |

Conics

| Surface Number | Constant |
|---|---|
| 2 | −1.9398E + 02 |

TABLE 1-continued

Even Polynomial Aspheres

| Surf. No. | D | E | F | G | H | I |
|---|---|---|---|---|---|---|
| 1 | −5.5195E−07 | −1.0713E−10 | 3.1479E−14 | −5.7484E−18 | 6.1604E−22 | −8.9173E−26 |
| 2 | 1.1325E−07 | −7.2072E−11 | −8.3839E−15 | −1.2759E−20 | −8.5801E−22 | 1.6785E−25 |
| 4 | −2.8412E−07 | −3.4636E−11 | −1.0778E−13 | 3.5508E−17 | −8.3433E−21 | 1.5423E−24 |
| 5 | −1.4043E−06 | 1.8900E−10 | 2.8916E−15 | −3.9504E−17 | 1.8623E−20 | −1.9552E−24 |
| 8 | −1.3276E−06 | 2.2532E−10 | −3.7469E−13 | 6.8848E−17 | 6.1456E−20 | −2.0995E−23 |
| 9 | −1.1185E−06 | −5.9118E−10 | −3.0478E−14 | 7.5880E−17 | 1.5753E−20 | −1.0854E−23 |
| 11 | 9.1156E−07 | 1.7192E−10 | 7.0610E−13 | −5.3712E−16 | 1.8891E−19 | −3.5346E−23 |
| 12 | 1.1530E−06 | 1.5285E−09 | −8.8458E−13 | 9.0388E−16 | −4.2610E−19 | 5.8397E−23 |
| 13 | −1.7092E−06 | 2.6669E−09 | −3.0629E−12 | 2.0327E−15 | −6.9802E−19 | 9.9679E−23 |

Variable Spaces

| Focus Pos. | Space 1 T(12) | Focal Shift | Image Distance |
|---|---|---|---|
| 1 | 45.530 | 0.340 | 0.009 |
| 2 | 46.724 | 0.037 | −0.001 |

First-Order Data

| | | |
|---|---|---|
| f/number | 1.23 | 1.25 |
| Magnification | −0.0931 | −0.1112 |
| Object Height | −1008.0 | −851.00 |
| Object Distance | −1209.6 | −1021.6 |
| Effective Focal Length | 102.31 | 101.37 |
| Image Distance | 0.86727E−02 | −.11816E−02 |
| Overall Length | 1386.0 | 1199.3 |
| Forward Vertex Distance | 176.48 | 177.66 |
| Barrel Length | 176.47 | 177.66 |
| Stop Surface Number | 9 | 9 |
| Distance to Stop | 0.00 | 0.00 |
| Stop Diameter | 92.490 | 92.395 |
| Entrance Pupil Distance | 66.139 | 66.139 |
| Exit Pupil Distance | −69.077 | −69.648 |

First Order Properties of Elements

| Element Number | Surface Numbers | | Power | f |
|---|---|---|---|---|
| 1 | 1 | 2 | 0.31398E−02 | 318.49 |
| 2 | 4 | 5 | −0.56004E−02 | −178.56 |
| 3 | 6 | 7 | 0.84102E−02 | 118.90 |
| 4 | 8 | 9 | 0.29157E−02 | 342.97 |
| 5 | 11 | 12 | 0.35750E−02 | 279.72 |
| 6 | 13 | 14 | −0.19286E−03 | −5185.0 |
| 7 | 14 | 15 | −0.76786E−02 | −130.23 |
| 8 | 15 | 16 | 0.94167E−03 | 1061.9 |

First-Order Properties of Negative Unit when Associated with CRT

| Element Numbers | | Surface Numbers | | Power | f |
|---|---|---|---|---|---|
| 6 | 8 | 13 | 16 | −0.70155E−02 | −142.54 |

TABLE 2

| Surf. No. | Type | Radius | Thickness | Glass | Clear Aperture Diameter |
|---|---|---|---|---|---|
| 1 | a | 335.2195 | 11.00000 | ACRYLIC | 109.16 |
| 2 | c | −281.5686 | 13.01901 | | 104.02 |
| 3 | | ∞ | 2.59344 | | 84.83 |
| 4 | a | 253.0301 | 8.00000 | STYRENE | 82.28 |
| 5 | a | 68.2415 | 1.55607 | | 82.55 |
| 6 | | 97.9238 | 23.5000 | SK5 | 83.60 |
| 7 | | −97.9238 | 0.43224 | | 84.02 |
| 8 | a | 68.7895 | 10.00000 | ACRYLIC | 78.12 |
| 9 | a | 88.5713 | 7.32837 | | 76.71 |
| 10 | | ∞ | 6.91585 | | 73.10 |
| 11 | a | −4092.0380 | 9.00000 | ACRYLIC | 74.80 |
| 12 | a | −128.8796 | Space 1 | | 74.11 |

TABLE 2-continued

| | | | | | |
|---|---|---|---|---|---|
| 13 | a | −53.3113 | 4.00000 | ACRYLIC | 84.07 |
| 14 | | −55.0000 | 9.00000 | 437500 | 88.80 |
| 15 | | ∞ | 14.10000 | 563500 | 130.00 |
| 16 | | −350.0000 | Image distance | | 140.00 |

Symbol Description a—Polynomial asphere
c—Conic section

Object and Image Surface

| Surface | Radius |
|---|---|
| Image | −350.0000 |

Conics

| Surface Number | Constant |
|---|---|
| 2 | −5.5055E + 00 |

Even Polynomial Aspheres

| Surf. No. | D | E | F | G | H | I |
|---|---|---|---|---|---|---|
| 1 | −1.1613E−06 | 4.5735E−11 | 7.0597E−14 | −2.6441E−17 | 4.8355E−21 | −4.1038E−25 |
| 4 | −5.9817E−07 | 3.0494E−11 | −4.0537E−13 | 1.4208E−16 | 1.2703E−20 | −7.4163E−24 |
| 5 | −1.6454E−06 | 1.0131E−10 | 3.0313E−14 | −1.7207E−16 | 1.4227E−19 | −2.9171E−23 |
| 8 | −2.3665E−06 | 3.8275E−10 | −8.2617E−13 | 1.3440E−16 | 1.9749E−19 | −4.7339E−23 |
| 9 | −2.5734E−06 | −1.0864E−09 | 1.9629E−13 | 4.9055E−17 | 7.0842E−20 | −1.9655E−23 |
| 11 | 1.3602E−06 | 7.6108E−10 | 1.4933E−12 | −1.4939E−15 | 6.8027E−19 | −1.7042E−22 |
| 12 | 2.0592E−06 | 2.4475E−09 | −1.5705E−12 | 2.7816E−15 | −1.7939E−18 | 3.1821E−22 |
| 13 | −3.5626E−06 | 7.6203E−09 | −9.8331E−12 | 6.9844E−15 | −2.5972E−18 | 4.0852E−22 |

Variable Spaces

| Focus Pos. | Space 1 T(12) | Image Distance | Focal Shift |
|---|---|---|---|
| 1 | 37.414 | 0.028 | 0.515 |
| 2 | 37.819 | 0.015 | 0.379 |

First-Order Data

| | | |
|---|---|---|
| f/number | 1.23 | 1.24 |
| Magnification | −0.0934 | −0.1005 |
| Object Height | −762.00 | −698.50 |
| Object Distance | −1036.1 | −966.29 |
| Effective Focal Length | 89.093 | 88.843 |
| Image Distance | 0.28374E−01 | 0.15126E−01 |
| Overall Length | 1194.0 | 1124.6 |
| Forward Vertex Distance | 157.89 | 158.28 |
| Barrel Length | 157.86 | 158.26 |
| Stop Surface Number | 6 | 6 |
| Distance to Stop | 33.26 | 33.26 |
| Stop Diameter | 85.534 | 85.690 |
| Entrance Pupil Distance | 58.716 | 58.716 |
| Exit Pupil Distance | −64.950 | −65.170 |

First Order Properties of Elements

| Element Number | Surface Numbers | | Power | f |
|---|---|---|---|---|
| 1 | 1 | 2 | 0.32076E−02 | 311.76 |
| 2 | 4 | 5 | −0.62642E−02 | −159.64 |
| 3 | 6 | 7 | 0.11541E−01 | 86.651 |
| 4 | 8 | 9 | 0.18711E−02 | 534.46 |
| 5 | 11 | 12 | 0.37134E−02 | 269.29 |
| 6 | 13 | 14 | −0.61709E−04 | −16205. |
| 7 | 14 | 15 | −0.79527E−02 | −125.74 |
| 8 | 15 | 16 | 0.16086E−02 | 621.67 |

First-Order Properties of Negative Unit when Associated with CRT

| Element Numbers | | Surface Numbers | | Power | f |
|---|---|---|---|---|---|
| 6 | 8 | 13 | 16 | −0.63613E − 02 | −157.20 |

TABLE 3

| Surf. No. | Type | Radius | Thickness | Glass | Clear Aperture Diameter |
|---|---|---|---|---|---|
| 1 | a | 183.8607 | 10.00000 | ACRYLIC | 91.80 |
| 2 | c | −334.6885 | 8.91596 | | 85.67 |
| 3 | a | −404.0650 | 7.00000 | STYRENE | 78.10 |
| 4 | a | 109.3349 | 1.30000 | | 77.20 |
| 5 | | 99.3167 | 21.00000 | SK18 | 79.16 |
| 6 | | −99.3167 | 0.50000 | | 79.19 |
| 7 | a | 59.7183 | 9.00000 | ACRYLIC | 71.12 |
| 8 | a | 77.4899 | 12.55810 | | 69.53 |
| 9 | a | 429.2780 | 9.00000 | ACRYLIC | 68.06 |
| 10 | a | −123.5628 | Space 1 | | 67.84 |
| 11 | a | −40.0420 | 4.00000 | ACRYLIC | 71.92 |
| 12 | | −45.0000 | 9.00000 | 432500 | 77.25 |
| 13 | | ∞ | 14.10000 | 562500 | 130.00 |
| 14 | | −350.0000 | Image distance | | 130.00 |

Symbol Description a—Polynomial asphere
c—Conic section

Object and Image Surface

| Surface | Radius |
|---|---|
| Image | −350.0000 |

Conics

| Surface Number | Constant |
|---|---|
| 2 | −2.1039E + 02 |

Even Polynomial Aspheres

| Surf. No. | D | E | F | G | H | I |
|---|---|---|---|---|---|---|
| 1 | −1.5279E−06 | −2.5091E−10 | 3.1049E−13 | −5.1932E −17 | 3.9878E−22 | −3.2253E−25 |
| 3 | −2.4488E−07 | −2.6319E−10 | −8.7145E−13 | 4.8158E −16 | −3.5438E−20 | −6.9851E−24 |
| 4 | −2.4369E−06 | 4.0362E−10 | 1.3770E−13 | −4.0433E −16 | 3.7989E−19 | −9.0044E−23 |
| 7 | −4.2376E−06 | 7.3887E−10 | −1.9975E−12 | 6.4526E −16 | 9.6290E−19 | −5.5629E−22 |
| 8 | −4.0474E−06 | −1.6877E−09 | 7.4813E−15 | 7.4285E −16 | 2.3295E−19 | −3.2497E−22 |
| 9 | 2.2387E−07 | −2.4544E−10 | 3.8443E−12 | −4.9023E −15 | 4.3072E−18 | −1.6390E−21 |
| 10 | 9.7330E−07 | 4.9031E−09 | −7.6044E−12 | 1.0596E −14 | −5.7514E−18 | 8.8474E−22 |
| 11 | −4.5889E−06 | 1.6253E−08 | −3.1557E−11 | 3.6166E −14 | −2.2102E−17 | 5.6074E−21 |

Variable Spaces

| Focus Pos. | Space 1 T(10) | Focal Shift | Image Distance |
|---|---|---|---|
| 1 | 28.031 | 0.191 | 0.000 |
| 2 | 28.567 | −0.039 | 0.000 |

First-Order Data

| | | |
|---|---|---|
| f/number | 1.20 | 1.21 |
| Magnification | −0.0855 | −0.0980 |
| Object Height | −800.00 | −698.50 |
| Object Distance | −982.20 | −862.69 |
| Effective Focal Length | 77.294 | 76.872 |
| Image Distance | 0.00 | 0.00 |
| Overall Length | 1116.6 | 997.63 |
| Forward Vertex Distance | 134.41 | 134.94 |
| Barrel Length | 134.41 | 134.94 |
| Stop Surface Number | 5 | 5 |
| Distance to Stop | 31.59 | 31.59 |
| Stop Diameter | 79.326 | 79.016 |
| Entrance Pupil Distance | 46.660 | 46.660 |
| Exit Pupil Distance | −54.522 | −54.792 |

First Order Properties of Elements

| Element Number | Surface Numbers | | Power | f |
|---|---|---|---|---|
| 1 | 1 | 2 | 0.41344E−02 | 241.87 |
| 2 | 3 | 4 | −0.69491E−02 | −143.90 |

TABLE 3-continued

| | | | | | |
|---|---|---|---|---|---|
| | 3 | 5 | 6 | 0.12380E−01 | 80.773 |
| | 4 | 7 | 8 | 0.22137E−02 | 451.73 |
| | 5 | 9 | 10 | 0.51187E−02 | 195.36 |
| | 6 | 11 | 12 | −0.99632E−03 | −1003.7 |
| | 7 | 12 | 13 | −0.96000E−02 | −104.17 |
| | 8 | 13 | 14 | 0.16057E−02 | 622.78 |

First-Order Properties of Negative Unit when Associated with CRT

| Element Numbers | | Surface Numbers | | Power | f |
|---|---|---|---|---|---|
| 6 | 8 | 11 | 14 | −0.89863E − 02 | −111.28 |

TABLE 4

| Surf. No. | Type | Radius | Thickness | Glass | Clear Aperture Diameter |
|---|---|---|---|---|---|
| 1 | a | −2676.2499 | 8.00000 | ACRYLIC | 66.17 |
| 2 | c | −52.7129 | 12.04758 | | 64.34 |
| 3 | | ∞ | 1.42639 | | 49.32 |
| 4 | a | 560.8589 | 4.40000 | STYRENE | 49.27 |
| 5 | a | 34.1346 | 0.88000 | | 50.91 |
| 6 | | 56.0863 | 15.00000 | SK18A | 50.84 |
| 7 | | −56.0863 | 0.50000 | | 51.14 |
| 8 | a | 32.7444 | 8.00000 | ACRYLIC | 49.09 |
| 9 | a | 40.8753 | 1.24197 | | 48.17 |
| 10 | | ∞ | 2.00000 | | 47.75 |
| 11 | a | −900.0738 | 6.00000 | ACRYLIC | 45.45 |
| 12 | a | −55.2870 | 16.97013 | | 44.86 |
| 13 | a | −24.3908 | 3.00000 | ACRYLIC | 43.45 |
| 14 | | −27.0000 | 10.00000 | 432500 | 46.26 |
| 15 | | ∞ | 2.00000 | FDS9 | 65.00 |
| 16 | | ∞ | −0.00011 | | 65.00 |

Symbol Description a—Polynomial asphere
c—Conic section

Conics

| Surface Number | Constant |
|---|---|
| 2 | −6.1972E + 00 |

Even Polynomial Aspheres

| Surf. No. | D | E | F | G | H | I |
|---|---|---|---|---|---|---|
| 1 | −4.8632E−06 | 1.2763E−09 | 3.4380E−12 | −6.1097E−15 | 4.2936E−18 | −1.1331E−21 |
| 4 | 1.1839E−06 | −4.2905E−09 | −1.9417E−11 | 2.8597E−14 | −6.6246E−18 | −3.4765E−21 |
| 5 | −1.2812E−05 | 5.5247E−09 | 2.6914E−12 | −4.3688E−14 | 8.9033E−17 | −5.3343E−20 |
| 8 | −1.9297E−05 | 1.2974E−08 | −6.1575E−11 | 3.9989E−14 | 1.6017E−16 | −1.6699E−19 |
| 9 | −1.8070E−05 | −2.0770E−08 | 1.2949E−11 | 1.8452E−14 | 6.6601E−17 | −1.0037E−19 |
| 11 | 9.8735E−07 | 5.2566E−09 | 9.4191E−11 | −3.0032E−13 | 5.0136E−16 | −5.0250E−19 |
| 12 | 4.1978E−06 | 2.7997E−08 | −9.0330E−11 | 5.7192E−13 | −1.3969E−15 | 9.4989E−19 |
| 13 | −1.4926E−05 | 8.6673E−08 | −4.6562E−10 | 1.5639E−12 | −2.7407E−15 | 2.0333E−18 |

First-Order Data

| | |
|---|---|
| f/number | 1.05 |
| Magnification | −0.0526 |
| Object Height | −610.00 |
| Object Distance | −993.533 |
| Effective Focal Length | 49.5523 |
| Image Distance | −.113249E−03 |
| Stop Surface Number | 6 |
| Focal Shift | 0.51912 |
| Overall Length | 1085.00 |
| Forward Vertex Distance | 91.4660 |
| Barrel Length | 91.4661 |
| Entrance Pupil Distance | 25.6144 |

TABLE 4-continued

| | | |
|---|---|---|
| Exit Pupil Distance | | −34.9774 |
| Stop Diameter | | 50.182 |
| Distance to Stop | | 0.00 |

First Order Properties of Elements

| Element Number | Surface Numbers | | Power | f |
|---|---|---|---|---|
| 1 | 1 | 2 | 0.91920E−02 | 108.79 |
| 2 | 4 | 5 | −0.16318E−01 | −61.283 |
| 3 | 6 | 7 | 0.21673E−01 | 46.141 |
| 4 | 8 | 9 | 0.39753E−02 | 251.56 |
| 5 | 11 | 12 | 0.84022E−02 | 119.02 |
| 6 | 13 | 14 | −0.12129E−02 | −824.50 |
| 7 | 14 | 15 | −0.16000E−01 | −62.500 |

TABLE 5

| Example | $CA_1$ | $Y_1$ | $R_{1BF}$ | $R_{2BF}$ |
|---|---|---|---|---|
| 1 | 60.3 | 45.9 | −696.5 | −296.7 |
| 2 | 54.6 | 39.3 | −544.5 | −294.3 |
| 3 | 45.9 | 35.3 | 1671.0 | −520.4 |
| 4 | 33.1 | 24.9 | −147.0 | −75.1 |

TABLE 6

PARAMETERS FOR MTF/OTF PLOTS

Figure 1B:
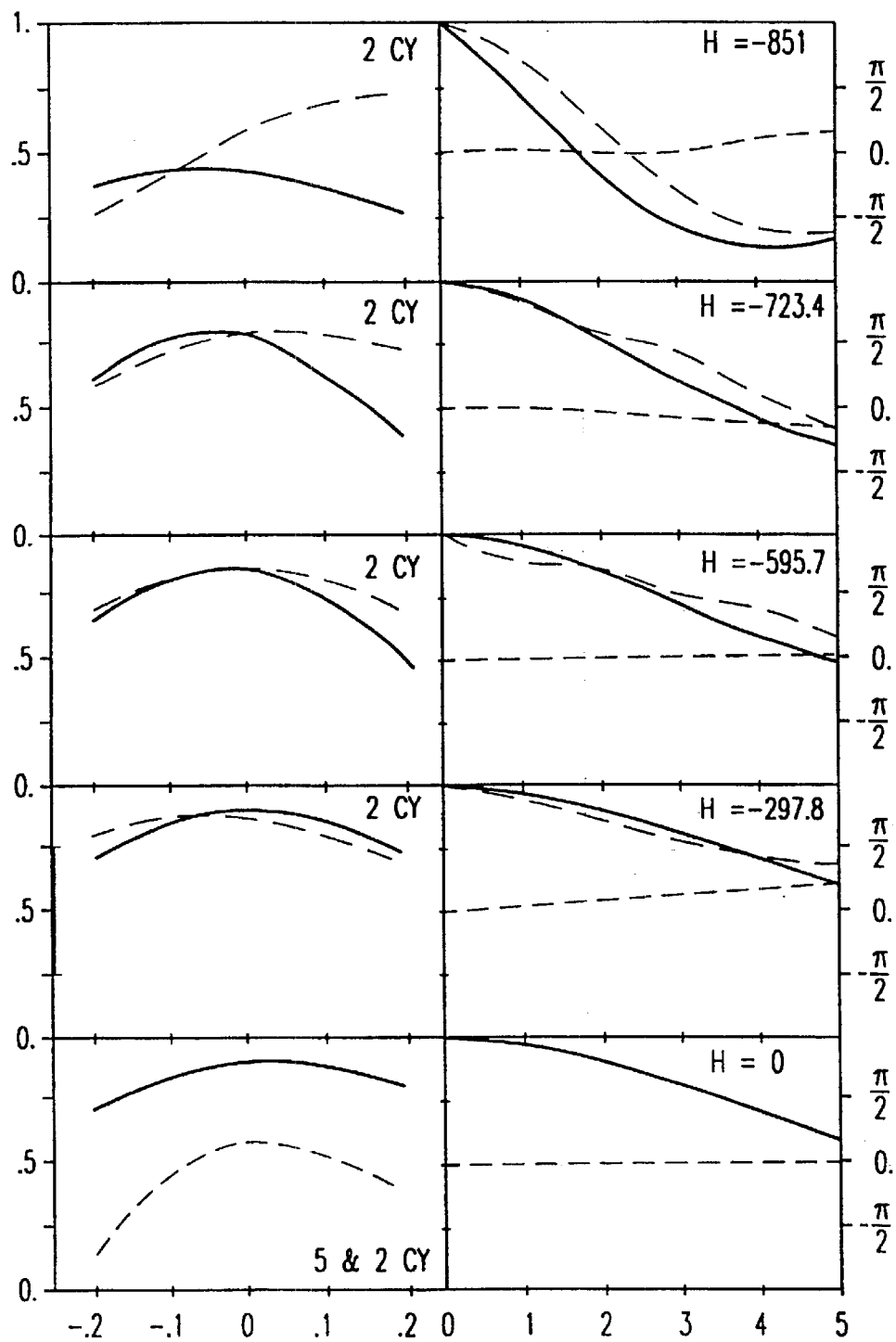
FIGS. 1B, 1C, 2B, 2C, 3B, 3C, and 4B are monochromatic MTF/OTF plots for the lens systems of FIGS. 1A, 2A, 3A, and 4A, respectively.
Figure 1C:
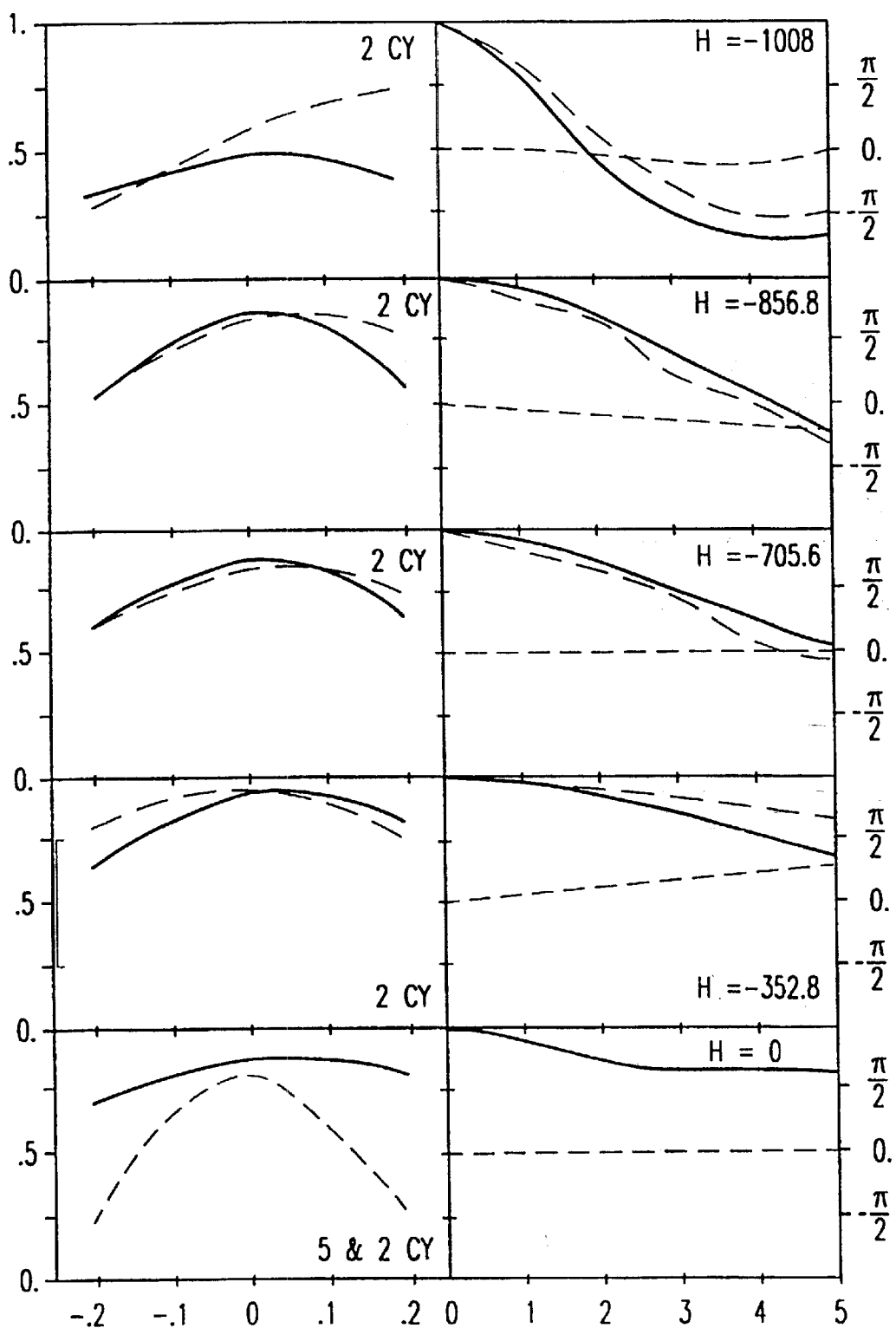
Figure 2A:
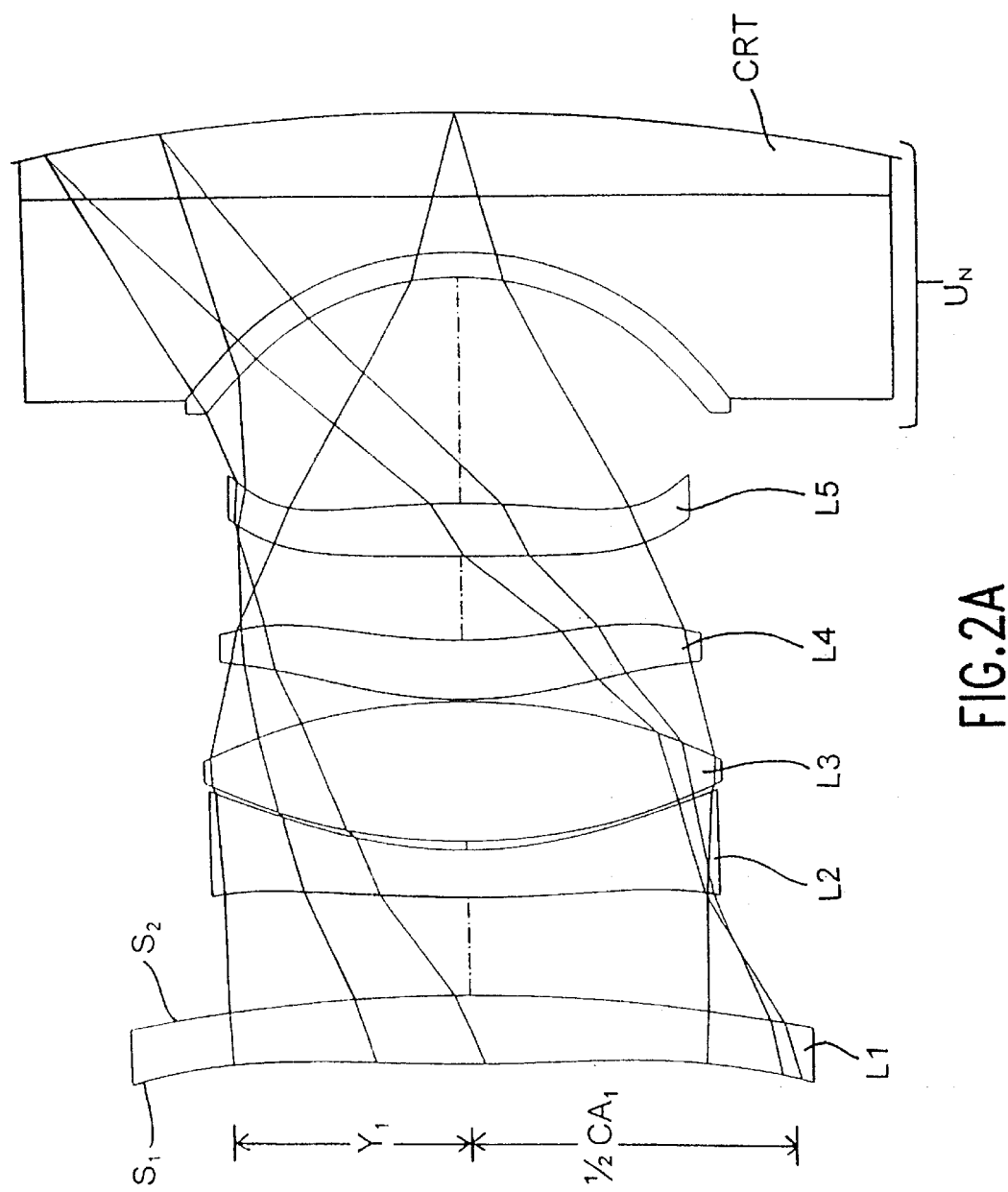
Figure 2B:
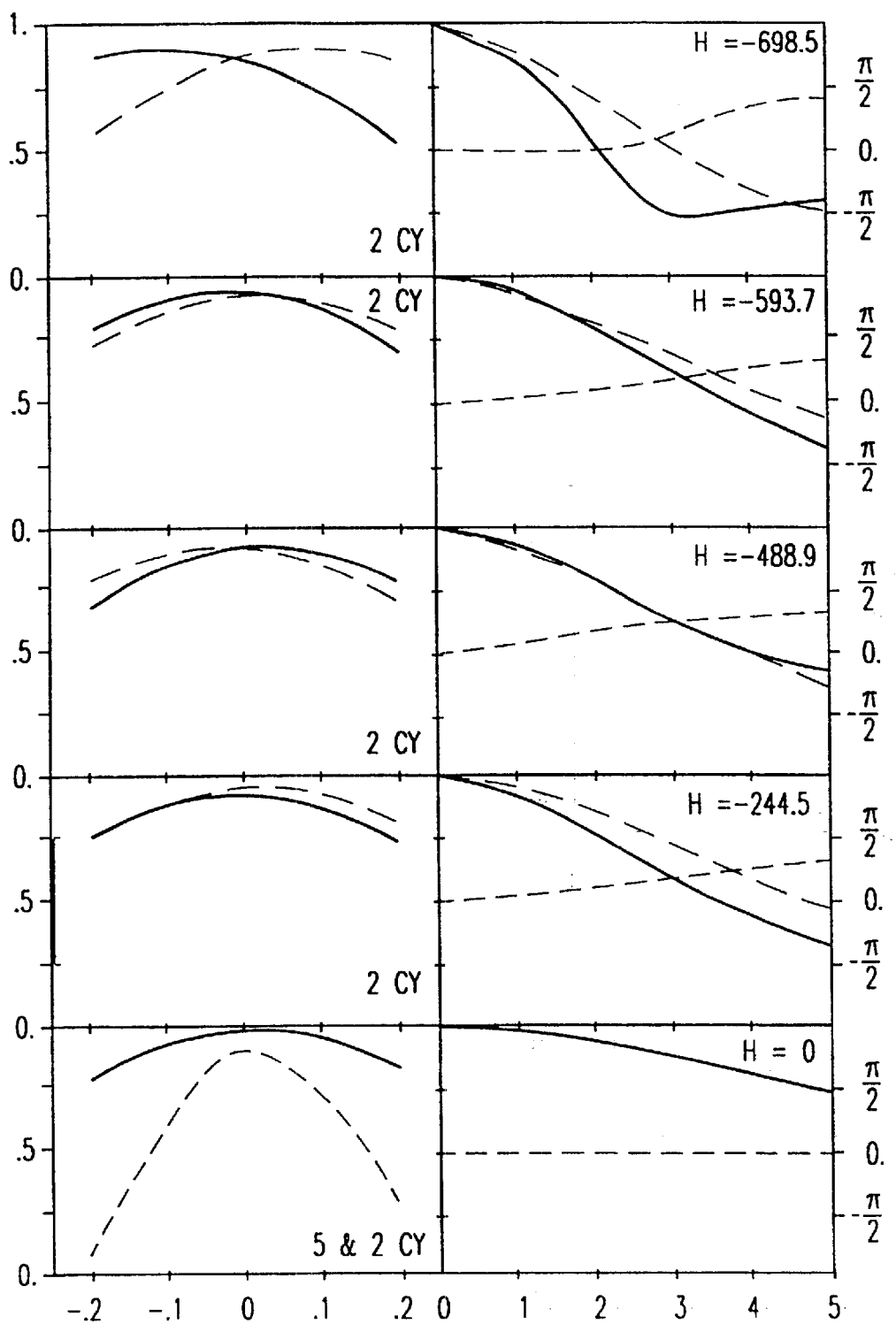
Figure 2C:
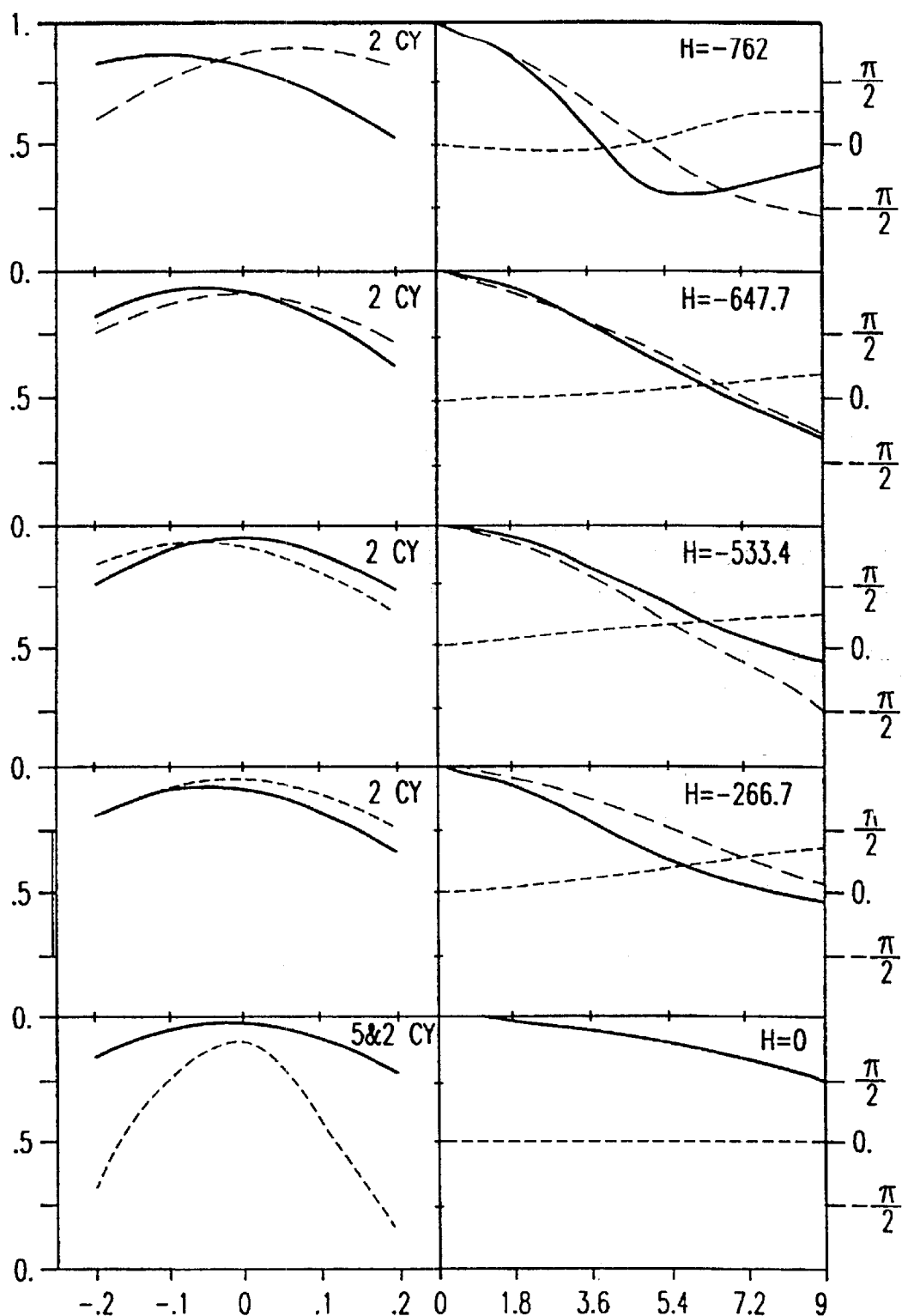
Figure 3A:
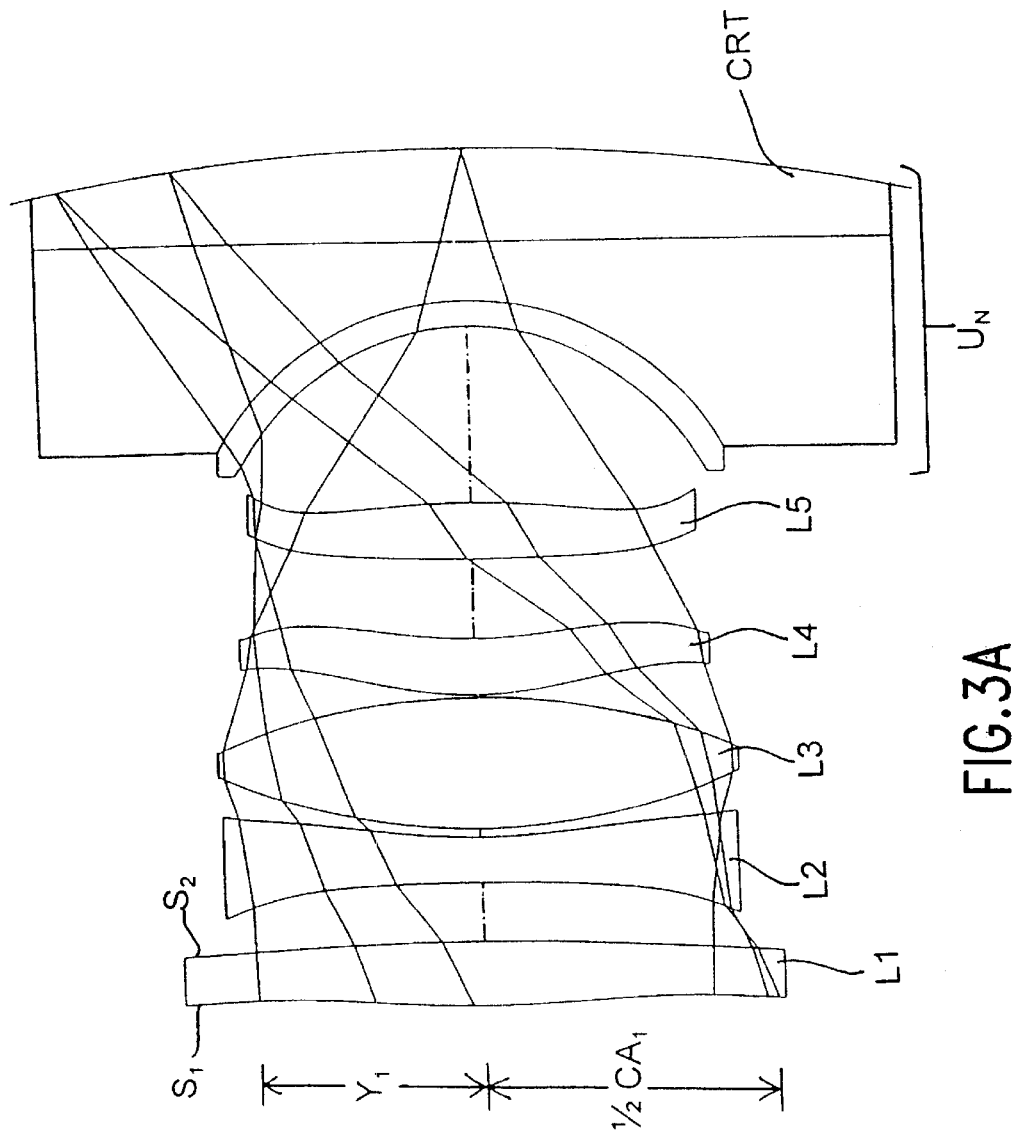
Figure 3B:
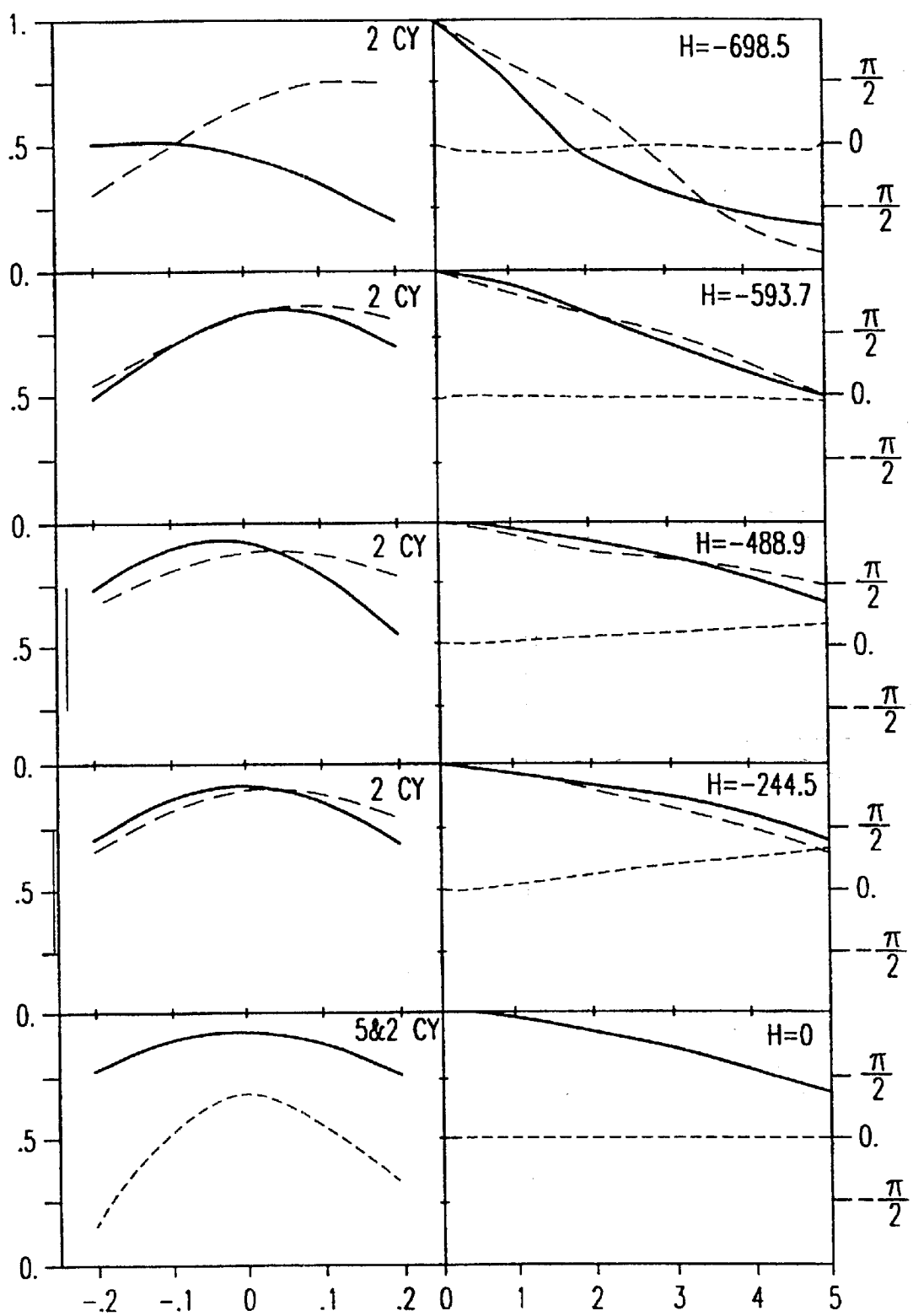
Figure 3C:
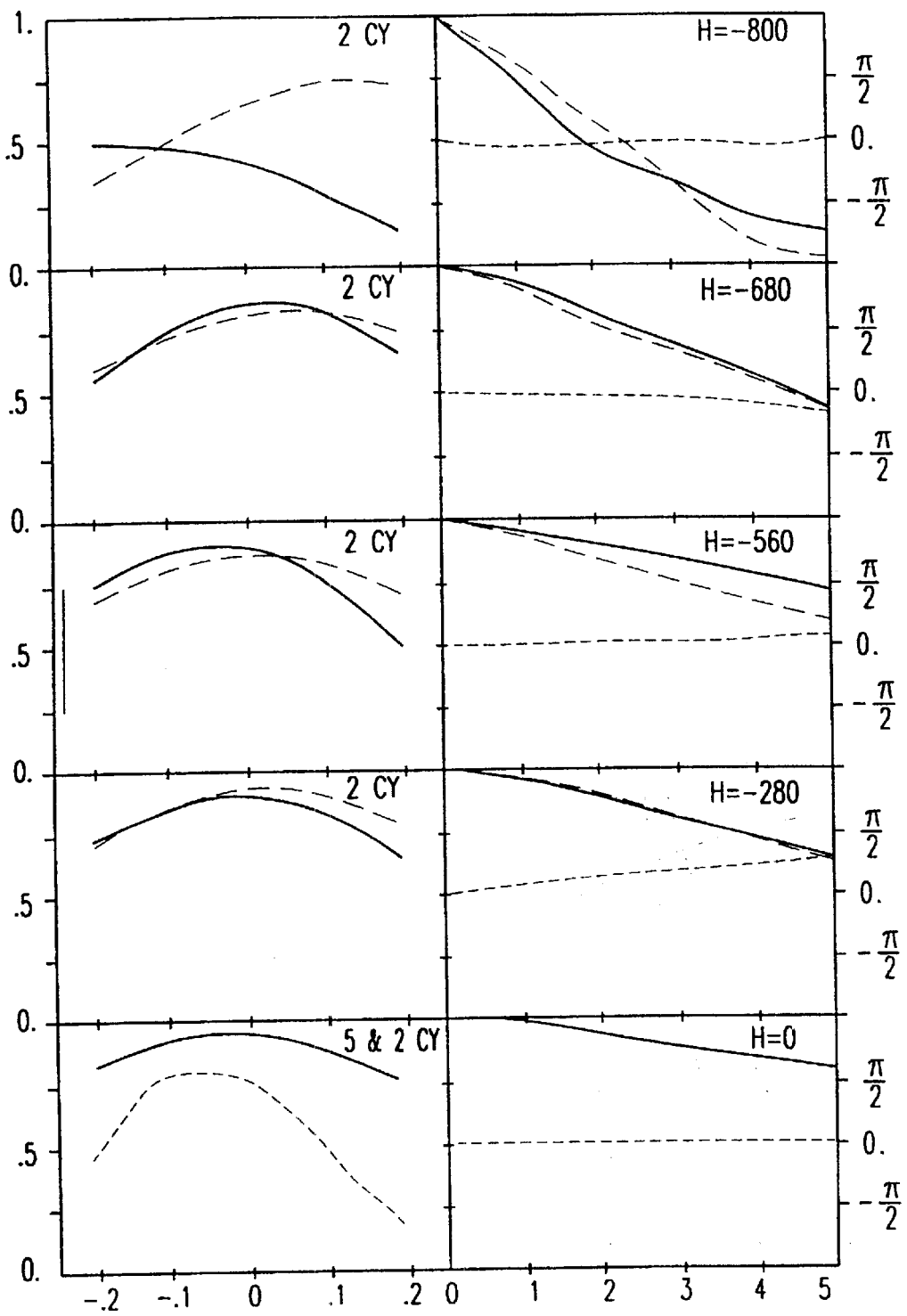

| Figure | Focal Length | Magnification | F/Number | Object Height | Image Height |
|---|---|---|---|---|---|
| FIG. 1B | 101.37 | −0.111 | 1.25 | −851.00 | 88.57 |
| FIG. 1C | 102.31 | −0.093 | 1.23 | −1008.00 | 87.81 |
| FIG. 2B | 88.84 | −0.101 | 1.24 | −698.50 | 67.15 |
| FIG. 2C | 89.09 | −0.093 | 1.23 | −762.00 | 68.03 |
| FIG. 3B | 76.87 | −0.098 | 1.21 | −698.50 | 63.19 |
| FIG. 3C | 77.29 | −0.086 | 1.20 | −800.00 | 63.28 |
| FIG. 4B | 49.55 | −0.053 | 1.05 | −610.00 | 31.75 |
| FIG. 5 | 71.79 | −0.101 | 1.07 | −635.00 | 63.48 |

What is claimed is:

1. A projection lens system for use with a cathode ray tube comprising in order from the image side:
    (a) a first lens element which has a positive power, an image side surface, and an object side surface, wherein:
        (i) at least one of the image and object side surfaces is aspherical; and
        (ii) the object side surface has a best fit spherical surface which is convex to the cathode ray tube;
    (b) a second lens element which has a negative power, at least one aspheric surface, and is composed of a high dispersion material;
    (c) a third lens element which has a positive power and provides a substantial portion of the power of the lens system;
    (d) a fourth lens element which has a weak power, at least one aspheric surface, and an overall meniscus shape which is concave to the cathode ray tube;
    (e) a fifth lens element which has a positive power and at least one aspheric surface; and
    (f) a lens unit which has a strong negative power, is associated with the CRT during use of the lens system, and provides most of the correction for the field curvature of the lens system.

2. The projection lens system of claim 1 wherein the high dispersion material is styrene.

3. The projection lens system of claim 1 wherein each of the first, second, fourth, and fifth lens elements has two aspheric surfaces.

4. The projection lens system of claim 1 wherein the third lens element is biconvex.

5. The projection lens system of claim 1 wherein the third lens element provides the majority of the power of the lens system.

6. The projection lens system of claim 1 wherein the third lens element is composed of a crown-type glass.

7. The projection lens system of claim 1 wherein the fourth lens element has a positive power.

8. The projection lens system of claim 1 wherein the lens system has a half angle field of view in the direction of the image of about 40 degrees.

9. The projection lens system of claim 1 wherein the f-number at infinity of the lens system is about 1.0.

10. A projection television set comprising a cathode ray tube, a screen, and a projection lens system for projecting light from the cathode ray tube onto the screen to form an image, said projection lens system comprising the projection lens system of claim 1.

11. A projection television set comprising three cathode ray tubes, a screen, and three projection lens systems, one projection lens system being associated with each of the cathode ray tubes for projecting light from that tube onto the screen to form an image, each projection lens system comprising the projection lens system of claim 1.

* * * * *